US005515601A

United States Patent [19]

Maejima

[11] Patent Number: 5,515,601

[45] Date of Patent: May 14, 1996

[54] TERMINAL INSERTION APPARATUS

[75] Inventor: Takamichi Maejima, Shizuoka, Japan

[73] Assignee: Yazaki Corporation, Tokyo, Japan

[21] Appl. No.: 376,967

[22] Filed: Jan. 23, 1995

[30] Foreign Application Priority Data

Jan. 24, 1994 [JP] Japan .................................... 6-005570

[51] Int. Cl.[6] ............................ B23P 19/04; H01R 43/00

[52] U.S. Cl. ............................ 29/748; 29/33 M; 29/759

[58] Field of Search .................................. 29/33 M, 747, 29/748, 759

[56] References Cited

U.S. PATENT DOCUMENTS

| | | | |
|---|---|---|---|
| 4,967,470 | 11/1990 | Folk | 29/759 X |
| 5,153,839 | 10/1992 | Cross | 29/33 M X |
| 5,315,756 | 5/1994 | Jurjevic et al. | 29/748 |
| 5,333,374 | 8/1994 | Pitta | 29/33 M X |

FOREIGN PATENT DOCUMENTS

| | | | |
|---|---|---|---|
| 585985 | 3/1994 | European Pat. Off. | 29/747 |
| 61-104578 | 5/1986 | Japan . | |
| 5-34676 | 5/1993 | Japan . | |
| 5-48246 | 6/1993 | Japan . | |
| 1356091 | 11/1987 | U.S.S.R. | 29/747 |

*Primary Examiner*—Peter Vo

*Attorney, Agent, or Firm*—Armstrong, Westerman, Hattori, McLeland & Naughton

[57] ABSTRACT

This invention provides a terminal insertion apparatus which enables a wired terminal to be inserted reliably and smoothly into a connector housing. The apparatus comprises comprises terminal guide arms (3, 3') that guide the wired terminal (4) toward the connector housing (15) and front wire gripping hands (6, 6) that push the wired terminal (4) into the connector housing (15). The terminal guide arms (3, 3') are provided with large terminal guiding chamfers (2). The front wire gripping hands (6, 6) are formed with protrusions (5) that hold the wire and can be advanced between the terminal guiding chamfers (2). The longitudinal length of the protrusions (5) is made smaller than the depth of the terminal guiding chamfers (2), and the lateral width of the protrusions (5) is set smaller than the lateral width of the terminal guiding chamfers (2).

6 Claims, 5 Drawing Sheets

TERMINAL INSERTION APPARATUS

BACKGROUND OF THE INVENTION

1. Field of the Invention

The present invention relates to a terminal insertion apparatus which enables a wired terminal to be inserted into a connector housing.

2. Description of the Related Art

FIGS. 6 to 8 show a conventional terminal insertion apparatus. The terminal insertion apparatus 20 comprises: a pair of terminal guide arms 21, 21' that push aside adjacent wires 4*b*' and then guide a wired terminal 4 into a terminal accommodating chamber 16 of the connector housing 15; and a pair of rod-like front and rear wire gripping hands 22, 23 that grip the base and rear portions, respectively, of the wired terminal 4 and feeds a terminal 4*a* into the terminal accommodating chamber 16.

The terminal guide arms 21, 21', as proposed in the Japanese Patent Application No. Heisei 5-209145, are roughly shaped like a wedge in cross section and have a terminal guiding chamfer 24 at the rear. One of the terminal guide arms 21 has a wedge-shaped front end portion 25 for insertion between wires, and the other terminal guide arm 21' has a notched portion 26 and a terminal insertion protrusion 27.

SUMMARY OF THE INVENTION

With the above-mentioned conventional structure, however, when a longitudinal length L1' of the terminal guide arms 21, 21' is set large, the front wire gripping hand 22 shifts toward the rear, rendering the terminal 4*a* more likely to swing. For this reason, the longitudinal length L1' is set as small as possible, which in turn reduces a width S1' (see FIG. 8) of the terminal guiding chamfers 24 and therefore the allowable lateral swing margin of the terminal 4*a*. This makes it necessary to provide an additional process of correcting the attitude of the terminal 4*a*, giving rise to a problem of increased tact time and cost.

With a view to overcoming the above-mentioned drawback, it is a primary object of this invention to provide a terminal insertion apparatus, which minimizes the lateral swing of the terminal and which allows the allowable lateral swing margin to be set large, thereby assuring smooth and reliable terminal insertion.

To achieve the above object, the terminal insertion apparatus of this invention basically comprises: a pair of terminal guide means for guiding a wired terminal toward a connector housing; a pair of wire gripping hands for pushing the wired terminal between the pair of terminal guide means into the connector housing; terminal guiding chamfers formed at a respective inner side at fear portions of the pair of terminal guide means so as to diverge outwardly; and protrusions provided at a respective side of the pair of wire gripping hands facing the pair of terminal guide means for advancement between the terminal guiding chamfers.

The protrusion of the wire gripping hand, while holding the wire near the terminal, advances between the terminal guiding chamfers of the terminal guide arms. The terminal is inserted along the terminal guiding chamfers of the arms into the connector housing.

DETAILED DESCRIPTION OF PREFERRED EMBODIMENT

Figure 1:
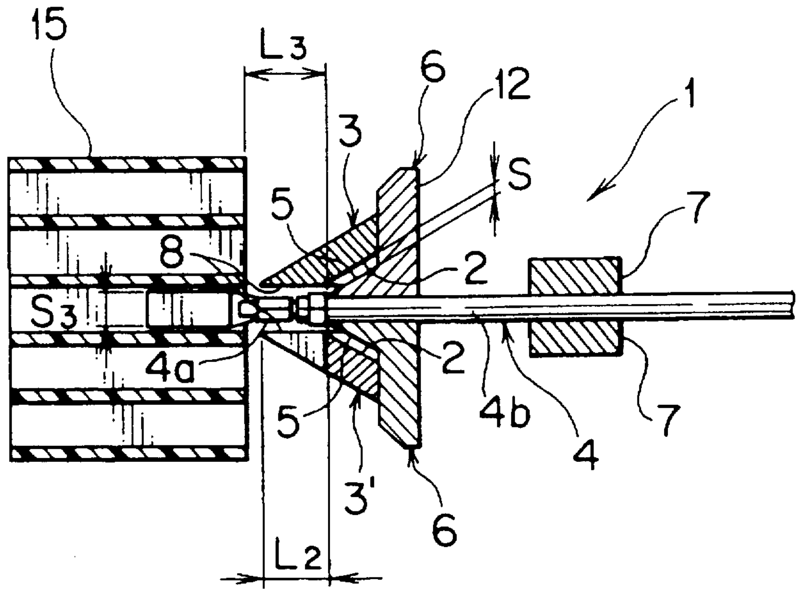
FIG. 1 is a transverse cross section of a terminal insertion apparatus as one embodiment of this invention.
Figure 2:
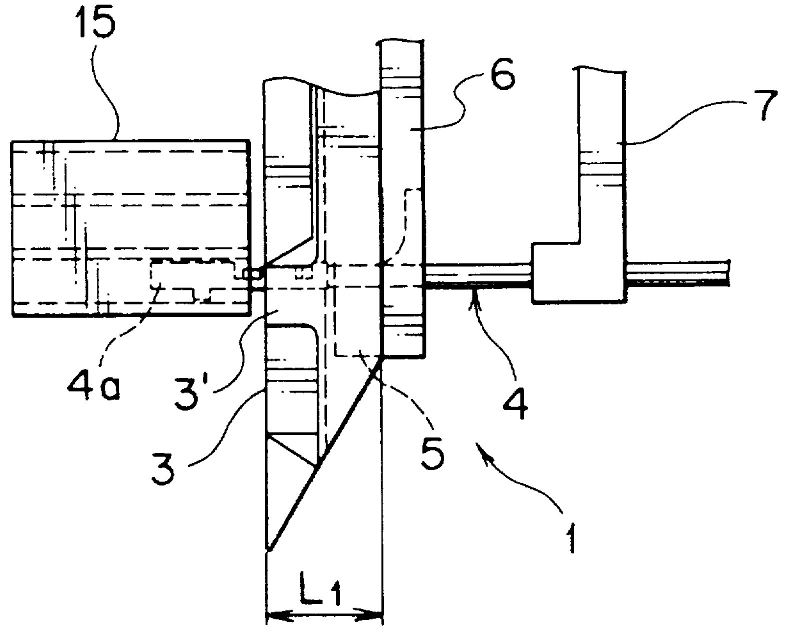
FIG. 2 is a side view of the same.

FIGS. 1 to 4 show one embodiment of the terminal insertion apparatus of this invention. The terminal insertion apparatus 1 comprises: a pair of terminal guide arms 3, 3' whose longitudinal length L1 is longer than that of conventional terminal guide arms 21, 21' and which have a large terminal guiding chamfer 2; a pair of front wire gripping hands 6, 6 which have protrusions 5 that advance between the terminal guiding chamfers 2 of the terminal guide arms 3, 3' and hold the wire end at the base of the terminal; and a pair of rear wire gripping hands 7, 7 of the same structure as the conventional one.

The terminal guide arms 3, 3' have a straight terminal insertion portion 8, and from the terminal insertion portion 8 to the rear end of the arms 3, 3' the terminal guiding chamfers 2 extend over almost the same length of the terminal insertion portion 8. The terminal guiding chamfer 2 has an inner tapered surface 2*a* (see FIG. 4) that is formed almost parallel to an outer tapered surface 9.

Figure 6:
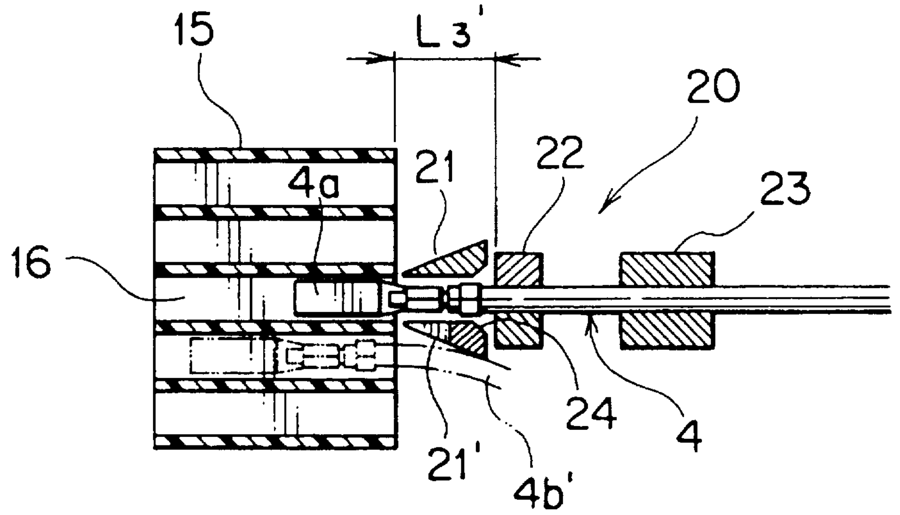
FIG. 6 PRIOR ART
FIG. 6 is a transverse cross section of a conventional terminal insertion apparatus.
Figure 7:
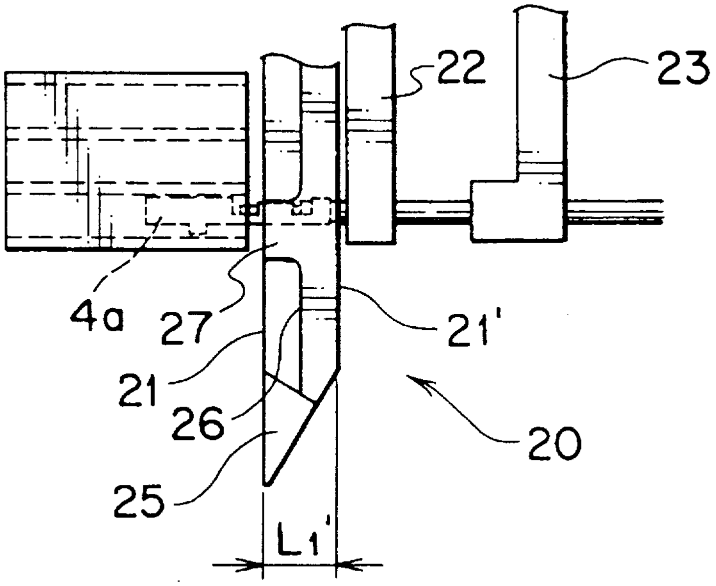
FIG. 7 PRIOR ART
FIG. 7 is a side view of the same.
Figure 8:
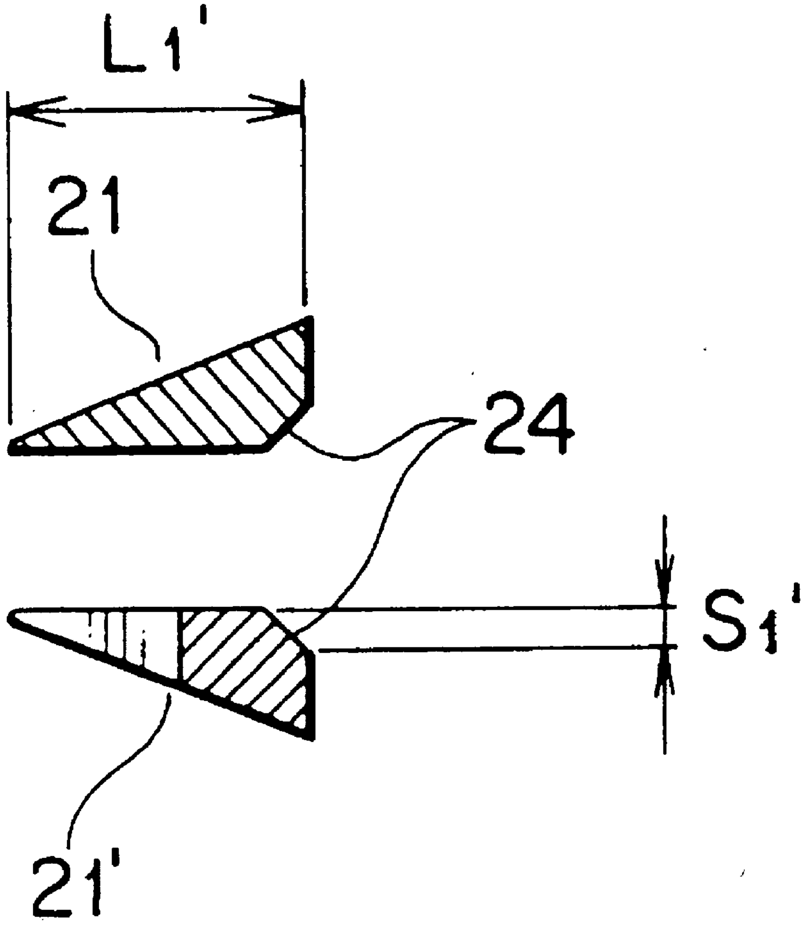
FIG. 8 PRIOR ART
FIG. 8 is a transverse cross section of terminal guide arms of the same.

The front wire gripping hands 6, 6 include laterally elongate base portions 12 and have the protrusions 5 integrally formed with the inner ends of the base portions 12, the base portions having engagement surfaces 11 (see FIG. 3) to be engaged with rear end surfaces 10 of the terminal guide arms 3, 3'. Each of the protrusions 5 is formed into a right-angled triangle in cross section having a straight gripping surface 13 and an outer tapered surface 14, which is formed parallel to the inner tapered surface 2*a* of the terminal guiding chamfer 2. Front ends 5*a* of the protrusions 5 contact the rear end of a crimped portion of the terminal 4*a* to stably hold the terminal 4*a* to prevent its swinging. The distance L3 from the front end 5*a* of the protrusion 5 to the connector housing 15 is set smaller than the distance L3' from the front end of the conventional wire gripping hand 22 (FIG. 6) to the connector housing 15.

Figure 3:
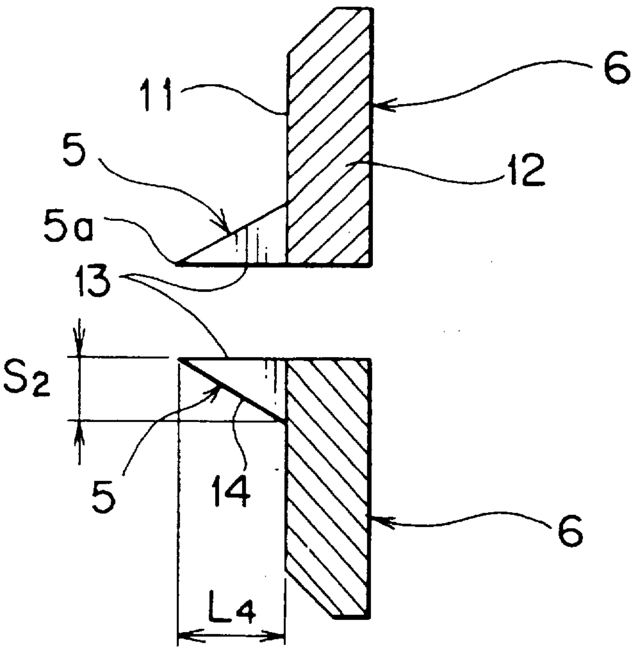
FIG. 3 is a transverse cross section of a front wire gripping hand.
Figure 4:
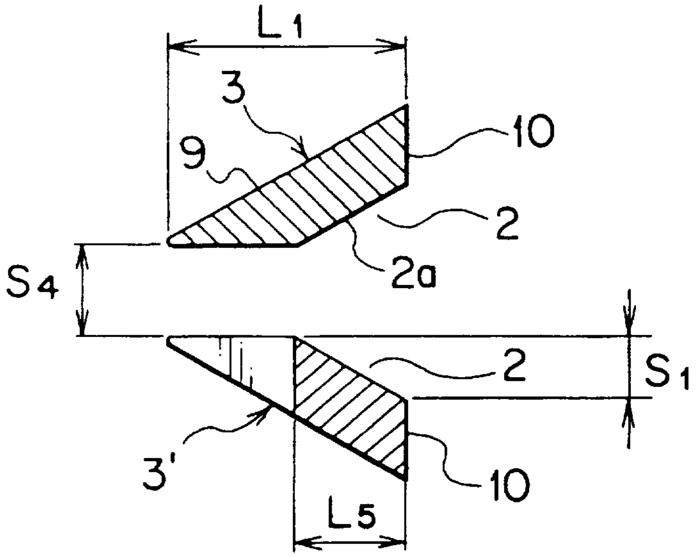
FIG. 4 is a transverse cross section of terminal guide arms.

The length L4 of the protrusions 5 is set slightly smaller than the depth L5 of the terminal guiding chamfers 2 of the terminal guide arms 3, 3', and the lateral width S2 perpendicular to the length of the protrusions 5 is set slightly smaller than the lateral width S1 of the terminal guiding chamfers 2 (see FIGS. 3 and 4). In the wire gripping state of FIG. 1—where the terminal guide arms 3, 3' are open to form a gap S4 slightly wider than the terminal width S3, the protrusions 5 of the front wire gripping hands 6, 6 hold the wire 4*b* with the front ends 5*a* of the protrusions 5 contacting the rear end of the crimped portion of the terminal 4*a*, and the front surfaces (engagement surfaces) 11 of the base portions 12 are in contact with the rear end surfaces 10 of the terminal guide arms 3, 3'—there is a gap S between the outer tapered surfaces 14 of the protrusions 5 and the inner tapered surfaces 2*a* of the terminal guiding chamfers 2 to allow the front wire gripping hands 6, 6 to open.

Then, with the front wire gripping hands 6, 6 completely open (releasing the wire 4*b*), the protrusions 5 completely fit inside the terminal guiding chamfers 2. In this condition, the wired terminal 4 can be smoothly inserted past the front wire gripping hands 6, 6 by the rear wire gripping hands 7, 7 during the second insertion process.

Figure 5A:
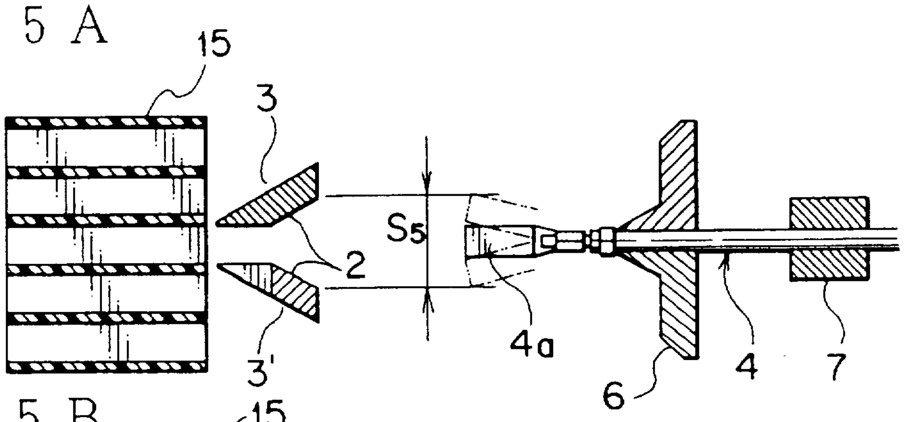
FIGS. 5A to 5D are transverse cross sections showing the process of inserting a terminal into the connector housing.

FIGS. 5A to 5D show the process of inserting the wired terminal 4 into the connector housing 15. As shown in FIG. 5A, the terminal 4*a* is allowed to swing within a wide range S5 of the terminal guiding chamfers 2, 2 of the terminal guide arms 3, 3'. In this embodiment, because the longitudinal length L1 of the terminal guide arms 3, 3' is set to double the conventional length, the allowable swing is increased by almost two times.

Figure 5B:
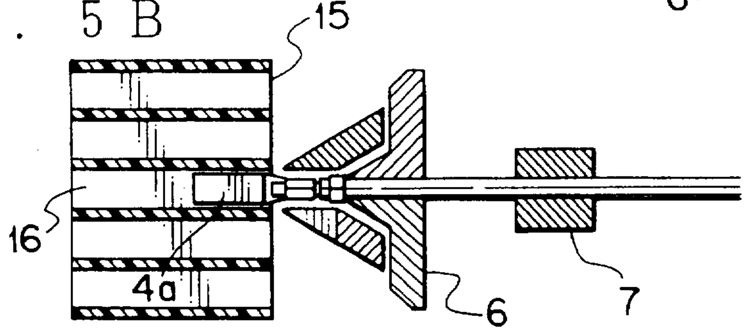
Figure 5C:
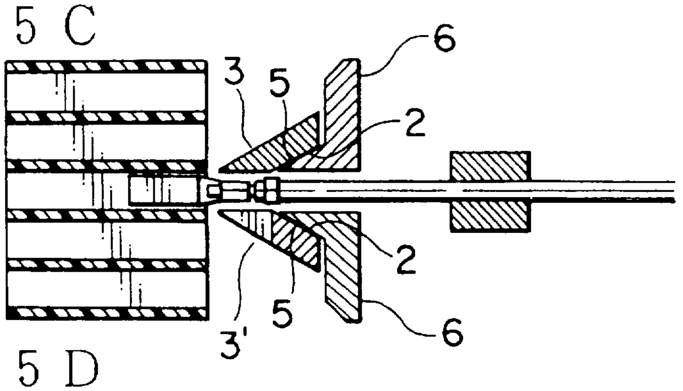
Figure 5D:
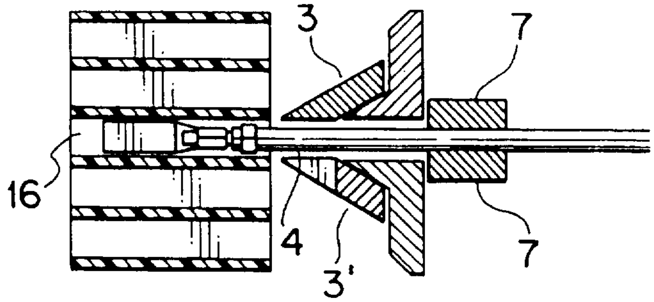

The pairs of the wire gripping hands 6, 7 holding the wired terminal 4 insert the front end of the terminal 4*a* between the terminal guide arms 3, 3' into a terminal accommodating chamber 16, as shown in FIG. 5B (preliminary insertion). Next, as shown in FIG. 5C, the front wire gripping hands 6, 6 are opened so that the protrusions 5 are fitted inside the terminal guiding chamfers 2, 2 of the terminal guide arms 3, 3'. Then, as shown in FIG. 5D, the rear wire gripping hands 7, 7 insert the wired terminal 4 into the terminal accommodating chamber 18 completely (secondary insertion).

With this invention, because the protrusions of the front wire gripping hands can hold the wire close to the terminal, the terminal swinging is reduced. Further, the terminal guiding chamfers of the terminal guide arms are set large to increase the allowable swinging of the terminal. Because the protrusions of the front wire gripping hands are advanced between the terminal guiding chamfers, the distance from the front end of the protrusions to the connector housing is shortened, making it possible to insert the terminal into the connector housing with ease. As a result, the process of correcting the terminal attitude is obviated, reducing the tact time and manufacture cost.

What is claimed is:

1. A terminal insertion apparatus for effecting guided movement of a wired terminal into a chamber of a connector housing, said apparatus comprising:

terminal guide means operative to guide a wired terminal toward said connector housing, said guide means including a pair of opposed guide arms, each having a forward end mutually cooperating to define an opening for selective longitudinal alignment with a housing chamber and a rear end defined by a laterally extending surface disposed substantially perpendicularly with respect to a longitudinal axis of said housing chamber, terminal guiding chamfers defined by tapered surfaces formed on inner sides of said guide arms and disposed to diverge rearwardly thereof, a pair of separable front wire gripping hands operative to move said wired terminals with respect to said terminal guide means into said connector housing chamber, each of said gripping hands containing a body having a wire gripping surface and an abutment surface adapted to engage the rear end of a cooperating guide arm substantially perpendicular with respect to said wire gripping surface, a protrusion extending forwardly from said abutment surface on each of said front gripping hands for reception between said guide arms, said protrusions each having a tapered surface extending substantially parallel to a facing terminal-guiding chamfer of a guide arm and being spaced therefrom when said wire gripping surfaces grip a terminal wire, means for separating said front gripping hands within said terminal guide means for releasing said terminal wire, a pair of rear wire gripping hands having separable surfaces for gripping said terminal wire, and means for moving said rear wire gripping hands with respect to said connector housing for extending said terminal into said housing chamber when said front wire gripping hands release said terminal wire.

2. A terminal insertion apparatus according to claim 1, wherein said tapered surfaces of said terminal guiding chamfers are each a straight surface.

3. A terminal insertion apparatus according to claim 2, wherein a cross section of each of said protrusions is in the form of a right-angled triangle.

4. A terminal insertion apparatus according to claim 2, wherein said pair of guide arms defining said terminal guide means each has an outer tapered surface parallel to a corresponding one of said tapered surfaces of the terminal guiding chamfers.

5. A terminal insertion apparatus according to claim 1, wherein a longitudinal length of each of said protrusions is smaller than a depth of the terminal guiding chamfer cooperating therewith and a lateral width of each of said protrusions is smaller than a lateral width of the respective terminal guiding chamfers.

6. A terminal insertion apparatus according to claim 1, wherein said terminal guiding chamfers correspond substantially in length measured in an insertion direction of said wired terminal with the protrusions of said pair of said front gripping hands.

* * * * *